United States Patent [19]
Onodera

[11] Patent Number: 5,244,274
[45] Date of Patent: Sep. 14, 1993

[54] GARBAGE PROCESSING VEHICLE

[75] Inventor: Kazuo Onodera, Okegawa, Japan

[73] Assignee: O.K. Laboratories Co., Ltd., Okegawa, Japan

[21] Appl. No.: 803,641

[22] Filed: Dec. 3, 1991

[30] Foreign Application Priority Data

Dec. 27, 1990 [JP] Japan .................................. 2-417622

[51] Int. Cl.⁵ .......................... B01F 15/06; B01F 9/02; B65F 3/00
[52] U.S. Cl. ..................................... 366/147; 34/135; 366/149; 366/227; 432/107
[58] Field of Search .......................... 34/130, 135–137; 237/12.3 C, 12.3 A, 2 A; 432/105, 107; 366/4, 7, 22–25, 54, 59, 61, 149, 227, 228, 220, 147

[56] References Cited
U.S. PATENT DOCUMENTS

| 964,921 | 7/1910 | Laughlin | 237/12.3 A |
|---|---|---|---|
| 1,055,125 | 3/1913 | Black | 34/136 X |
| 1,095,976 | 5/1914 | Ashlock et al. | 237/12.3 A |
| 1,282,590 | 10/1918 | Kernohan | 237/12.3 C X |
| 1,621,099 | 3/1927 | Barrett | 366/149 X |
| 1,875,516 | 9/1932 | Stary | 366/24 |
| 2,781,186 | 2/1957 | Harbers et al. | 366/61 X |
| 3,171,723 | 3/1965 | Hansen | 34/135 X |
| 3,691,648 | 9/1972 | Kraus | 100/73 X |
| 4,101,039 | 7/1978 | Talenti . | |
| 4,487,507 | 12/1984 | Van Wyngaarden | 366/227 X |
| 4,506,983 | 3/1985 | Marr | 366/59 X |
| 4,730,400 | 3/1988 | Johannsen | 34/135 X |

FOREIGN PATENT DOCUMENTS

| 3004090 | 8/1981 | Fed. Rep. of Germany | 366/22 |
|---|---|---|---|
| 3104769A1 | 9/1982 | Fed. Rep. of Germany . | |
| 3837865A1 | 10/1990 | Fed. Rep. of Germany . | |
| 1-017701 | 5/1989 | Japan . | |
| 57-068198 | 8/2983 | Japan . | |
| 501884 | 4/1976 | U.S.S.R. | 366/16 |
| 1546313 | 2/1990 | U.S.S.R. | 366/54 |
| 661458 | 11/1951 | United Kingdom | 34/135 |

Primary Examiner—Harvey C. Hornsby
Assistant Examiner—Charles Cooley
Attorney, Agent, or Firm—Weintraub, DuRoss & Brady

[57] ABSTRACT

A garbage processing vehicle includes a rotational fermentation drum device which is disposed on a loading platform of a vehicle, for mixing garbage with aerobic microorganisms and air in a rotational drum and providing conditions favorable to fermentation. By processing the garbage in a vehicle, device installation space can be saved and the garbage can be processed during transportation. Exhaust heat of the vehicle's engine is conducted to a peripheral space of the drum and air sucked from the periphery of the engine is supplied to the inside of the drum to promote fermentation.

3 Claims, 2 Drawing Sheets

GARBAGE PROCESSING VEHICLE

BACKGROUND OF THE INVENTION

1. Field of the Invention

The present invention concerns a garbage processing vehicle for applying fermentation to garbage during its collection and transportation, for example, from homes, companies and hospitals.

2. Prior Art

Garbage discharged from, for example, homes, companies, schools, shops and hospitals has generally been collected by so-called garbage collecting vehicles and then burnt in garbage burning plants. However, incineration of the garbage results in various problems such as extravagance of energy usage and generation of public pollution, as well as wasteful discarding of garbage which is a type of resource.

The present inventors have previously made a study of the fermentative disposal of garbage by utilizing aerobic microorganisms, in order to satisfy social demands to minimize the above-noted problems associated with garbage disposal. The study has been directed to the processing of garbage by bacterial fermentation and decomposition, which enables remarkable reduction of the volume and easy discarding thereof. Based on the result of the study, the present inventor has developed a processing box for garbage, such as that discharged from homes, with no requirement for recovery for more than a year, and put it into practical use.

Further, for making the fermentative processing system more efficient, a garbage processing device based on a stationary rotary drum type fermentation system has also been developed. In the device, garbage charged into a drum rotating around a horizontal axis is fermented under the effect of microorganisms to decompose proteins and fibrous materials in the garbage. The processing device has the following merits:

(1) The volume of the garbage can be reduced to 1/10–1/30 of its original value.

(2) No offensive odors are released in the course of the fermentation.

(3) Materials after processing can be utilized as agricultural fertilizers or animal feed.

The processing device has also been put to practical use in a system for modifying or improving raw meat, which becomes unsavory with lapse of time, into animal feed.

Since the existent garbage processing device as described above has been adapted to dispose garbage by using a box or a rotational drum installed on the ground, an installation site is necessary, and disposed products have to be finally collected from the installation site and transported to garbage disposing plants even if this seldom occurs, for example, once a year.

SUMMARY OF AND OBJECT OF THE INVENTION

In view of the foregoing problems, an object of the present invention is to provide a garbage processing system for applying fermentative processing in a vehicle which transports collected garbage to final disposing plants, and which is capable of minimizing the required installation space, energy and resources.

According to the present invention, for attaining the foregoing object, there is provided a first feature of a garbage processing vehicle in which a rotational fermentation drum is disposed on a loading platform of a vehicle, for mixing garbage with aerobic microorganisms and air in the drum and providing conditions to promote fermentation.

Since a rotational fermentation drum device, for mixing the garbage with aerobic microorganisms and air therein is disposed on the loading platform of the vehicle, the garbage can be processed on the garbage collecting vehicle during transport thereof. Accordingly, the fermentation facility disposed so far on the ground can be eliminated, and the processing time for fermentation can be minimized or avoided both in the discharging site and the final disposing place.

In the second feature of the present invention, the garbage processing vehicle is adapted such that engine exhaust heat can be conducted to a peripheral space of the rotational drum.

Since the exhaust heat of the engine can be conducted to the peripheral space of the rotational drum, the exhaust heat can be effectively utilized for the promotion of fermentation to attain further energy saving.

In the third feature of the present invention, the garbage processing vehicle is adapted so that a rotational driving system for the rotational drum is connected with an engine of the vehicle so as to provide a mechanical driving system.

Since the rotational driving system for the rotational drum is connected with the engine of the vehicle, an additional or independent driving source can be avoided to simplify the mechanism driving system.

In the fourth feature of the present invention, the garbage processing vehicle is so adapted that air, sucked from the periphery of the engine, can be supplied to the upper portion of the rotational drum, to supply appropriate warm air necessary for fermentation to the rotational drum.

Since air, sucked from the periphery of the engine, can be supplied to the upper portion of the rotational drum, an appropriately warmed air can be supplied to the inside of the rotational drum to maintain a condition suitable to promote fermentation.

As a result, the prior art garbage collecting operations conducted by the self-covering bodies can be simplified to attain labor saving and energy saving, and a new source of revenue can be provided by the reutilization of the resource. Thus, the system of the present invention is able to provide an excellent and improved garbage processing system.

DESCRIPTION OF THE DRAWING

These and other objects as well as advantageous features of the present invention will become apparent by reading the following descriptions for the preferred embodiments according to the present invention with reference to the accompanying drawings, wherein.

DESCRIPTION OF THE PREFERRED EMBODIMENTS

Figure 1:
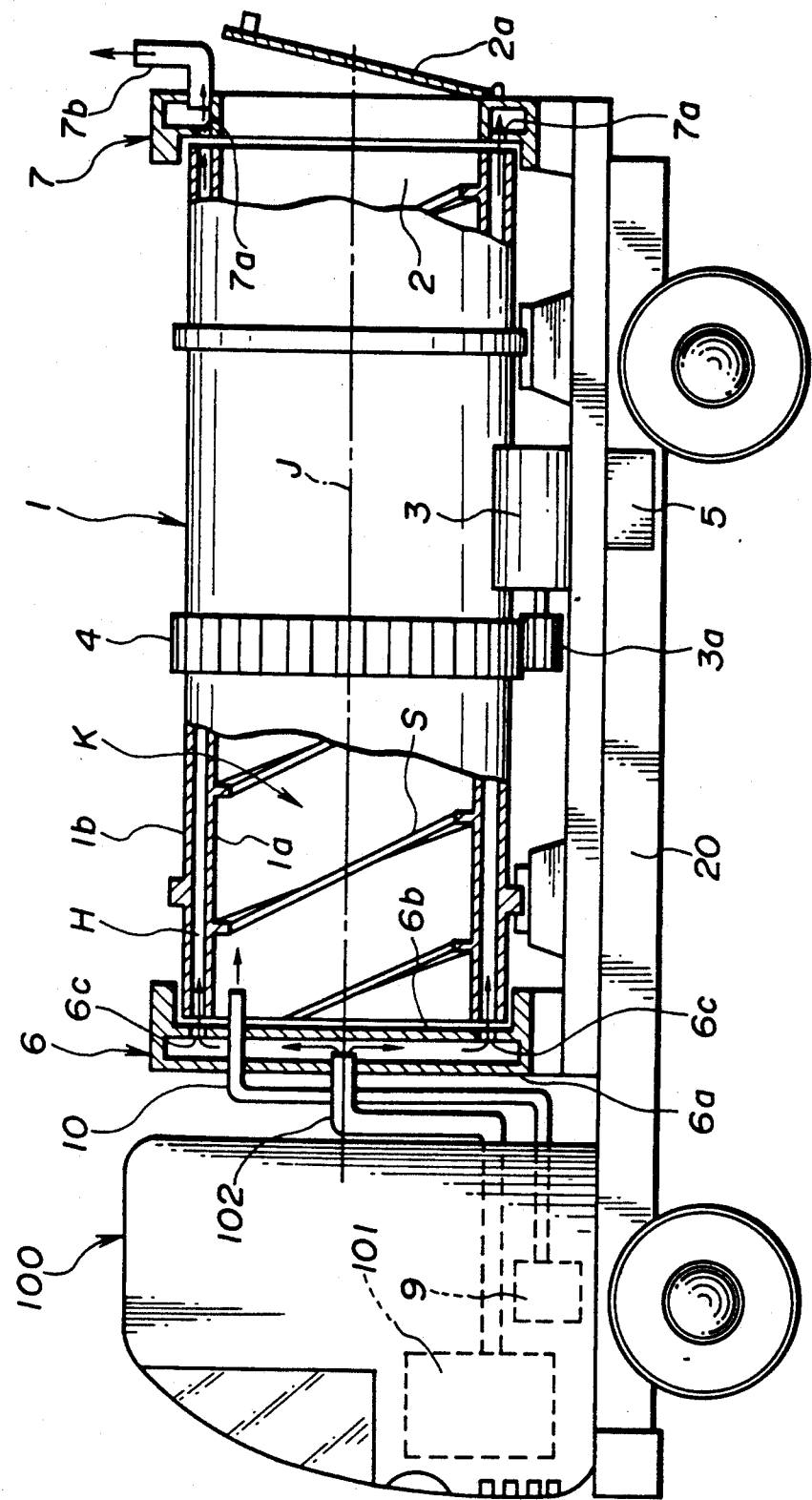
FIG. 1 is a side elevational view, partially cut away and partially shown in cross-section, illustrating an entire constitution of a garbage processing vehicle according to the present invention.
Figure 2:
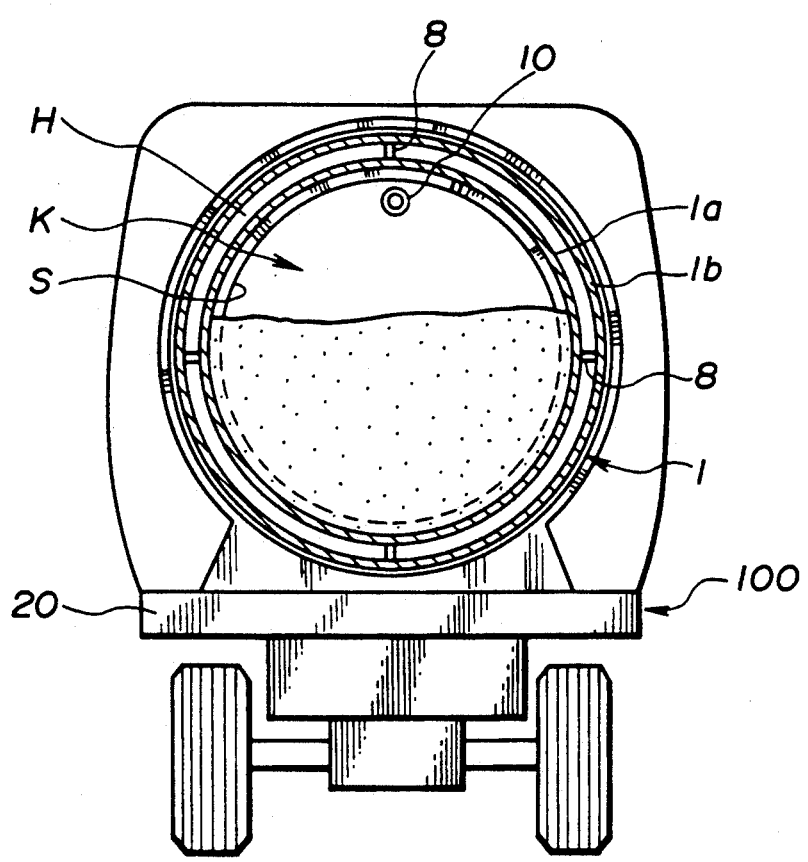
FIG. 2 is a cross sectional view illustrating the inside of a rotational drum of the garbage processing vehicle according to the present invention.

As shown in FIG. 1 illustrating the entire constitution of a garbage processing vehicle according to the present invention, a hollow cylindrical rotational drum 1 is placed on a loading platform 20 of a vehicle 100 and it is adapted such that garbage is placed into a rear entrance port 2 and can be contained in an internal space K where the garbage is mixed with fermentative microorganisms (not illustrated). Further, the rotational drum 1 is made rotatable around a rotational axis J which is in parallel with the advancing direction of the vehicle 100 and can be rotated at an appropriate speed by an electric motor 3.

Further, an agitation/conveying screw S is formed to the inner wall surface of the rotational drum 1, such that the garbage in the drum can be conveyed while being stirred with air and fermentative microorganisms and also mixed properly with newly added garbage. A gear 4 (which may be replaced with a chain or like other connection means) disposed around the periphery of the rotational drum 1 is connected with a driving gear 3a disposed to a driving shaft of the electric motor 3. An opening/closing lid 2a is pivotally attached to the entrance port 2, and a vent portion for extracting air in the drum 1 is formed through the opening/closing lid 2a.

The aerobic fermentative microorganisms to be mixed into the rotational drum 1 comprise:

OK bacteria: aerobic mesophile bacteria and

Z bacteria: thermophile bacteria exhibiting activity near 80° C. or in a higher temperature region. They may be used alone or in an appropriate blending of both of them. Since the bacteria generate heat in the course of fermentation and growing while taking the garbages as their "feed", the inside of the rotational drum 1 is maintained at a temperature higher than a predetermined level. On the other hand and, since various kinds of putrefying bacteria attributable to the putrefaction of the garbages, giving offensive odors, are usually killed at a medium to high temperature region higher than 50° C., only the fermentative bacteria grow explosively in the rotational drum 1, making it possible for rapid processing in a period as short as 2 to 5 hours.

As the driving power source for the electric motor 3, rechargeable batteries may of course be used but, in this depicted embodiment, the system is simplified by using an electric generator 5 interlocked with the engine of the vehicle 100. Alternatively, the rotational drum 1 may be rotated by a driving force transmitted from the driving system of the vehicle 100 by means of mechanical transmission.

A temperature retaining space H comprises an air passing gap formed between the inner surface 1a of the rotational drum 1 and the outer surface 1b thereof, so that the exhaust heat from an engine exhaust pipe 102 of an engine 101 of the vehicle 100 can be conducted properly to the inside of the rotational drum 1. More specifically, it is constituted as described below. That is, the exhaust pipe 102 is connected to a front wall 6a of a stationary hollow vertical wall 6 covering the front end of the rotational drum 1, while apertures 6c in communication with the temperature retaining space H are formed to the rear wall 6b of the vertical wall 6, so that the exhaust heat can intrude as shown by the arrows. The heat entering the temperature retaining space H can enter the stationary hollow annular wall 7 covering the rear end of the drum through an aperture 7a of the front wall thereof and can be discharged through an exhaust port 7b disposed through the rear wall. Further, the temperature retaining space H is adapted such that entering exhaust heat advances spirally under the guiding effect of a guiding plate 8 that connects the inner surface 1a with the outer surface 1b, so that the temperature at the inside of the rotational drum 1 is kept at about 80° C. and the growing circumstances for the fermentative microorganisms can be maintained.

A pump 9 is disposed in the engine compartment of the vehicle 100 for sucking air (heat) from the periphery of the engine 101 and injecting it through a conduit 10 to the upper portion of the space K in the drum 1, and the pump 9 supplies air necessary for the fermentation in the drum 1. Air is taken in from the periphery of the engine so as not to cool the inside of the drum 1.

When garbage is collected by the embodiment described above in urban areas and then transported, for example, to agricultural farms in the suburbs, a system of applying a fermentation process to the collected garbage during transportation and taking out products processed as fertilizers or feed at the destination is established.

That is, the garbage is added through the entrance port 2 of the rotational drum 1 placed on the loading platform 20 of the vehicle 100 and then the opening/closing lid 2a is closed. In this case, since the exhaust gas from the engine exhaust pipe 102 flows into the temperature retaining space H between the inner surface 1a and the outer surface 1b of the rotational drum 1, and then flows to the exhaust port 7b at the rear end, the temperature in the rotational drum 1 can be maintained at a level suitable to the growing of the aerobic microorganisms due to the heat of the exhaust and the warm air at the periphery of the engine.

Since the rotational drum 1 is rotated by the electric motor 3 by way of the gear 4, the garbage, air and aerobic microorganisms are properly mixed by the screw S. As a result, fermentation in the rotational drum 1 proceeds explosively, by which process the garbage is converted into fertilizer or animal feed in several hours during which time it is being transported from the urban areas to the agricultural farms in the suburbs. In the field, since the products can be taken out through the entrance port 2 by opening the opening/closing lid 2a, a garbage proceeding vehicle is a "moving garbage processing plant" can be realized.

I claim:

1. A garbage processing vehicle for fermenting garbage therein, the vehicle comprising:
   (a) a loading platform;
   (b) an engine mounted on the loading platform;
   (c) a rotatable fermentation drum mounted on the loading platform of the vehicle, said drum comprising a cylindrical shell having an outer surface, an inner surface and an entrance port, the inner surface having a helical screw deployed thereon, the shell defining an interior for receiving garbage therein;
   (d) means for supplying heated air to the interior of the drum;
   (e) means for supplying exhaust gas from the engine to a peripheral space of the drum between the outer surface and the inner surface;
   (f) means for rotating the drum, said means for rotating comprising a gear formed circumferentially around the drum and an electric motor coupled to the gear;
   (g) means for supplying a sufficient quantity of aerobic microorganisms to the interior of the drum for fermenting the garbage; and
   wherein the heated air and exhaust gas keeps the interior of the drum at a temperature suitable for activation of the aerobic microorganisms for fermentation of the garbage.

2. A garbage processing vehicle as defined in claim 1, wherein the means for supplying exhaust gas comprises a first conduit connecting the engine and the peripheral space of the rotatable drum.

3. A garbage processing vehicle as defined in claim 1, wherein the means for supplying heated air comprises a second conduit running from the periphery of the engine to the interior of the rotatable drum.

* * * * *